(12) United States Patent
Schulz

(10) Patent No.: US 9,063,334 B2
(45) Date of Patent: Jun. 23, 2015

(54) MICROSCOPE HAVING SWITCHABLE ILLUMINATION MODES AND METHOD OF OPERATING THE SAME

(71) Applicant: Leica Microsystems CMS GmbH, Wetzlar (DE)

(72) Inventor: Christian Schulz, Solms (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 227 days.

(21) Appl. No.: 13/686,549

(22) Filed: Nov. 27, 2012

(65) Prior Publication Data

US 2013/0135717 A1    May 30, 2013

(30) Foreign Application Priority Data

Nov. 28, 2011    (DE) .......................... 10 2011 087 196

(51) Int. Cl.

| | |
|---|---|
| *G02B 21/06* | (2006.01) |
| *G02B 21/00* | (2006.01) |
| *G02B 27/58* | (2006.01) |
| *G02B 21/16* | (2006.01) |
| *G02B 21/36* | (2006.01) |

(52) U.S. Cl.
CPC ............ *G02B 21/06* (2013.01); *G02B 21/0032* (2013.01); *G02B 21/0028* (2013.01); *G02B 21/0076* (2013.01); *G02B 21/16* (2013.01); *G02B 21/367* (2013.01); *G02B 27/58* (2013.01)

(58) Field of Classification Search
CPC ............... G02B 21/06; G02B 21/0032; G02B 21/0028; G02B 27/58; G02B 21/0076; G02B 21/16; G02B 21/367

USPC .......................................................... 359/388
See application file for complete search history.

(56) References Cited

U.S. PATENT DOCUMENTS

| 4,397,529 A * | 8/1983 | Taira .............................. 359/381 |
| 6,545,761 B1 * | 4/2003 | Aziz et al. ...................... 356/497 |
| 7,009,785 B2 * | 3/2006 | Engelhardt et al. ............ 359/819 |
| 7,187,494 B2 * | 3/2007 | Nishiwaki et al. ............. 359/388 |

(Continued)

FOREIGN PATENT DOCUMENTS

DE    199 01 219 A1    9/1999

OTHER PUBLICATIONS

German-language Search Report dated Nov. 30, 2012 (five (5) pages).

*Primary Examiner* — Frank Font
(74) *Attorney, Agent, or Firm* — Crowell & Moring LLP

(57) ABSTRACT

The present invention relates to a microscope illumination system for switching between a first, confocal and a second, non-confocal microscope illumination mode, the system having an illumination unit that, in order to provide the first illumination mode, includes an illumination source for generating an illumination beam propagating parallel to the optical axis; a scanning mirror for deflecting the illumination beam perpendicular to the optical axis; and a scanning eyepiece and a downstream scanning tube lens for imaging the scanning mirror into the back focal plane of a microscope objective and for expanding the illumination beam, the objective focusing the illumination beam onto a specimen to be examined. In order to provide the second illumination mode, the system has a focusing lens inserted into the path of the illumination beam in such a way that the illumination beam is focused into the back focal plane of the microscope objective.

11 Claims, 3 Drawing Sheets

(56) References Cited

U.S. PATENT DOCUMENTS

| | | |
|---|---|---|
| 7,369,308 B2 * | 5/2008 | Tsuruta et al. ................ 359/388 |
| 7,551,351 B2 | 6/2009 | Ulrich et al. |
| 7,715,078 B2 * | 5/2010 | Okugawa ................... 359/212.1 |
| 8,284,484 B2 * | 10/2012 | Hoult et al. ................... 359/385 |
| 8,982,455 B2 * | 3/2015 | Redford ........................ 359/372 |
| 2005/0174631 A1 | 8/2005 | Nishiwaki et al. |
| 2009/0279169 A1 * | 11/2009 | Hoult et al. ................... 359/385 |
| 2011/0284767 A1 * | 11/2011 | Wolleschensky et al. . 250/459.1 |

* cited by examiner

MICROSCOPE HAVING SWITCHABLE ILLUMINATION MODES AND METHOD OF OPERATING THE SAME

The present invention is directed to a microscope illumination system and to a corresponding method for providing microscope illumination for localization microscopy, the intention being, in particular, to allow switching to a different illumination mode for scanning microscopes, in particular confocal microscopes.

BACKGROUND ART

The present invention relates to the technical implementation of a method of super-resolution localization microscopy. Such methods are characterized in that during the acquisition of an image, only a few object points emit light simultaneously at a given time. If these points have a spacing significantly greater than the optical resolution, then the positions of these points can be determined by mathematical centroid-determination methods with an accuracy higher than the optical resolution of the objective used. When many of these individual images of different object points are summed, it is finally possible to create a super-resolution image of the entire object. Known variants of such methods differ in the way in which they ensure that only a few object points emit light simultaneously. Examples of names of such methods are PALM, STORM and GSDIM. The latter method will be briefly described hereinafter.

GSDIM stands for "Ground State Depletion followed by Individual Molecule return". This method uses fluorophores that have triplet states (also "dark states"). Initially, a dye molecule is transferred from the ground state to an excited state by irradiation of adequate laser power. A transition occurs from the excited state to the triplet state, the triplet state having a far longer lifetime (about 100 ms) than the excited singlet state (only about 3 ns), so that given sufficient light intensity, the molecules accumulate in the triplet state. The molecules return from the triplet state to the ground state, producing spontaneous emission. Individual images of these spontaneous emissions are recorded, and the positions of the spontaneous emissions can be determined by the aforementioned mathematical methods with an accuracy higher than the optical resolution. The achievable resolution is between 20 and 25 nm, generally less than 60 nm. However, the achievable resolution also depends on the laser power and the resolution of the camera used.

The main technical requirement for implementing GSDIM is the fluorescence excitation of the specimen with high-power light. This can be accomplished through suitable laser illumination which may, in turn, be provided by a Total Internal Reflection Fluorescence Microscope (TIRF) illumination apparatus, which focuses the laser beam into the pupil of the objective (back focal plane of the objective). This has the advantage of providing homogeneous illumination of the specimen and, at the same time, high depth of focus of the illumination. In order to optimally use the power of the laser, the cross section of the laser beam is reduced to such an extent that the illuminated specimen field is only one-fourth as compared to TIRF illumination (for example, the diameter of the illuminated specimen field is about 60 µm when using a 100× magnification objective, while in TIRF illumination, this diameter is about 250 µm).

The method of switching between the TIRF illumination and illumination for GSDIM will be illustrated below with reference to FIGS. 1a and 1b.

Following are some initial observations on TIRF microscopy. Typically, an inverse light microscope having an oil-immersion objective with a high numerical aperture is used to achieve the flat angle of incidence required for total reflection. The total reflection occurs at the interface between the cover slip and the specimen. A so-called evanescent field is formed in the region behind the cover slip. The intensity of this field decreases exponentially into the specimen. For visible light, the penetration depth is typically 100 to 200 nm. If fluorescent molecules capable of absorbing the irradiated wavelength of light are present in this region, these molecules can then be excited to emit fluorescent light. Since the observable layer in the specimen is only 100 to 200 nm thick, it is possible to achieve a significantly higher resolution along the optical axis than with normal fluorescence microscopy (layer regions of typically 500 nm). In TIRF microscopy, the excitation light is coupled in at the edge of the objective, so that it strikes the cover slip at the required flat angle.

FIG. 1a schematically shows a typical TIRF illumination with an illumination beam 16: The light (represented by dashed lines) originating from a light source 18 (typically a laser) is collimated by collimating optics 17. The collimated light is focused by a scanning eyepiece 13. Transporting optics 14 image the focus onto back focal plane 6 of objective 7, the light previously being reflected by splitting mirror 19. The splitting mirror may provide, for example, physical separation, geometrical separation, color separation, or polarization separation. Transporting optics 14 are needed due to the mechanical characteristics of a microscope stand, because scanning eyepiece 13 cannot be mounted close enough to objective 7 to be able to focus directly onto its back focal plane 6. To enable the use of objectives which have their back focal planes in different positions, scanning eyepiece 13 is focusable (indicated by an arrow). The laser beam focused into back focal plane 6 of objective 7 is projected by the objective as a parallel beam into the space of specimen 8 (object space). This parallel beam illuminates a circle having a diameter $D_a$ (typically about 250 µm) in specimen 8.

For TIRF microscopy, it is crucial that scanning mirror 12 (shown schematically) be tiltable. By tilting scanning mirror 12 (indicated by two arrows), the focus is moved in back focal plane 6 perpendicularly to the optical axis of the objective. As a result, the laser beam passes through specimen 8 at an angle that is dependent on the tilt of scanning mirror 12. When this angle is greater than the angle of total reflection between the cover slip and the specimen medium, then one speaks of TIRF microscopy, as explained above.

The specimen illuminated in this way then emits fluorescent light (represented by solid lines). This light passes through beam splitter 19 and forms an image 22 through a tube lens 21.

FIG. 1b shows a typical illumination for a GSDIM method. What is crucial here is a high laser power per illuminated specimen area. Consequently, it is required that the laser power act on a greatly reduced specimen diameter $D_b$ (typically about 60 µm). This can be accomplished by modifying the TIRF illumination described with reference to FIG. 1a in a manner that will allow switching between TIRF and GSDIM illumination. In the TIRF illumination apparatus described above, this is achieved by inserting a telescope 11 (represented by dashed lines) into the optical path to reduce the beam diameter. In this way, the circle illuminated in the specimen is reduced to a diameter $D_b$ (here about 60 µm), as a result of which the power density is increased by a factor of about 18. Typically, the laser beam strikes specimen 8 at normal incidence. In rare cases, observation is performed with scanning mirror 12 in tilted position. For further details, reference is made to the explanations given with reference to FIG. 1a.

The above-described known approach of switching from TIRF illumination to GSDIM illumination has the advantage of being relatively easy to accomplish by inserting a telescope, but it also has the following disadvantages: GSDIM microscopy is very rarely performed under TIRF conditions; i.e., with scanning mirror 12 in tilted position. What is even more important is that TIRF itself is a very rarely used application, so that it appears to make little sense to combine it with GSDIM microscopy. Consequently, most of the users interested in localization microscopy are forced to make a purchase that includes a complex TIRF illumination apparatus which they will rarely use.

Another application is confocal microscopy. In this regard, reference is made to the extensive prior art. Confocal microscopy, unlike conventional light microscopy (also "wide-field microscopy"), does not illuminate the entire specimen, but only a portion or point of the specimen at any point in time. The specimen is illuminated and scanned point by point through the microscope objective using a suitably focused laser or a point light source. Thus, it is possible to successively measure the intensities of the reflected light at all scanned positions of the specimen. Subsequently, an image of the specimen is constructed from the measured light intensities. Due to their high axial resolution, confocal microscopes enable acquisition of a large number of such images at different focal planes, and thus generation of a sharp three-dimensional image. To this end, the excitation light of the laser or point light source is focused into different focal planes in the specimen. The light reflected from the specimen is imaged onto a pinhole, generally through the same objective through which it is focused onto the specimen, and passes through the pinhole to a detector. The excitation focus and the detection focus are confocal to each other, i.e., coincide. From there, the name "confocal microscopy". Light from planes outside the focal plane cannot pass through the pinhole to the detector. By scanning the specimen in the x-y direction; i.e., in a plane perpendicular to the optical axis of the objective (z-direction), it is possible to obtain the image of the specimen in the selected focal plane ($z=z_0$).

U.S. Pat. No. 7,187,494 B2 describes a microscope system which allows switching from TIRF microscopy to confocal microscopy. FIG. 6 of this document illustrates a typical configuration of a laser scanning microscope for confocal microscopy. FIG. 7 of this document depicts the typical configuration of a TIRF microscope. Based on a combination of a confocal microscope and a TIRF microscope, as shown in FIG. 8 of that document, this U.S. patent deals with an alternative solution for such a combination, which includes the use of optics that can be inserted into the optical path of the confocal microscope to focus the laser light into the back focal plane of the objective, with the chief rays being parallel to the optical axis at the position of the back focal plane. The latter requirement is necessary for TIRF illumination. As an alternative embodiment of the aforementioned combination, this patent publication describes the use of a complete, folded optical path to allow switching between TIRF and confocal microscopy.

U.S. Pat. No. 7,551,351 B2 describes a microscope with TIRF illumination for optically manipulating a specimen. This document proposes a microscope system whose illumination can be switched between TIRF illumination and manipulation laser illumination. The manipulation laser is used for bleaching, for marking purposes and/or for microdissection. Switching between TIRF illumination and manipulation laser illumination is accomplished either using a mirror which can be inserted into the optical path of the TIRF laser, or using an activatable lens.

German Patent Publication DE 199 012 19 A1 discloses an optical arrangement disposed in the illumination beam path of a confocal laser microscope and adapted to provide optimal illumination while reducing loss of excitation light. To this end, a lens and downstream varifocal optics are disposed downstream of the laser. This arrangement is used to expand the narrow cross section of the parallel laser beam. The beam expanded in this way is directed onto a scanning mirror and reflected by it toward the objective. The beam passing through the entrance pupil of the objective is focused by the objective onto the object. Using the aforementioned varifocal lens, the diameter of the illumination beam can be adjusted, with greater or lesser accuracy, to the entrance pupil of the objective used in order to prevent loss of light.

It is an object of the present invention to provide a (second) non-confocal illumination which is particularly suitable for localization microscopy, in particular for a GSDIM method, and which can be used independently of a TIRF illumination. In particular, such an illumination is intended to be switchable to a (first) illumination that is suitable for confocal microscopy.

SUMMARY OF THE INVENTION

This object is achieved by a microscope illumination system, the use thereof, and a microscope illumination method according to the independent claims. Advantageous embodiments will be apparent from the corresponding dependent claims and the following description.

Advantages of the Invention

In accordance with the present invention, there is provided a microscope illumination system for localization microscopy, which will hereinafter also be referred to more generally as "second mode of microscope illumination", whereby it is possible to switch between a first mode of microscope illumination, in particular an illumination for confocal microscopy, and this second mode of microscope illumination. The microscope illumination system of the present invention has a microscope illumination unit which, in order to provide the first microscope illumination, includes the following components: an illumination source device for generating an illumination beam that propagates parallel to the optical axis, a scanning mirror device for deflecting the illumination beam in a plane perpendicular to the optical axis, as well as a scanning eyepiece and a downstream scanning tube lens for imaging the scanning mirror device into the back focal plane of a microscope objective and for expanding the illumination beam, the microscope objective focusing the illumination beam onto a specimen to be examined. In order to provide the second microscope illumination mode, namely, in particular, to provide an illumination that is suitable for localization microscopy, this microscope illumination unit has a focusing lens which can be inserted into the path of the illumination beam in such a way that the illumination beam is focused into the back focal plane of the microscope objective.

Due to the aforesaid scanning mirror device, the first microscope illumination mode suited especially for laser scanning microscopy illumination, i.e., especially for confocal microscopy, while the second microscope illumination mode is suited especially for localization microscopy and, more specifically, for the GSDIM method described at the outset.

While the known prior art has heretofore only provided microscope illumination systems which have a TIRF illumination apparatus capable of being converted by suitable means into an illumination apparatus for confocal microscopy or into one for localization microscopy, respectively, the present invention proposes a combination of microscope illumination modes that are suitable, in particular, for confocal microscopy and localization microscopy. The advantage of this combination is that confocal microscopes form part of the recognized state-of-the art for high-resolution fluorescence microscopy and are used for quantitative investigations at the highest optical resolution. The above-described localization microscopy aims in the same direction, so that the possibility of combining a confocal microscope with a localization microscope offers tremendous advantages to the user. In particular, it is possible to use the same lasers for the respective microscope illumination modes.

The present invention takes the different optical imaging conditions in the two described microscope illumination modes into account and makes a corresponding adaptation that allows switching between the microscope illumination modes.

For purposes of further description, but without loss of generality, it is assumed that the first microscope illumination mode is confocal microscopy illumination. Similarly, the second microscope illumination mode is assumed to be a microscope illumination for GSDIM. The switching from confocal microscopy illumination to GSDIM illumination is described hereafter. This description is, of course, also applicable to the opposite case, where GSDIM illumination is switched to confocal microscopy illumination. Both switching directions are equivalent.

An illumination source device is used first to generate an illumination beam that propagates parallel to the optical axis. For confocal microscopy, typically, a collimated laser beam is used. In order to provide the first microscopy illumination mode, namely the confocal microscopy illumination mode, telescope optics are disposed in the path of the illumination beam to expand the illumination beam in diameter.

This illumination beam (expanded laser beam) propagates parallel to the optical axis and strikes a scanning mirror device capable of deflecting the illumination beam in known manner in a plane perpendicular to the optical axis. When the optical axis is identified with the z-direction, then the aforesaid plane is the x-y plane. The scanning mirror device is used in the manner described above to scan the specimen being examined in a focal plane.

The microscope illumination unit includes, as additional components, a scanning eyepiece and a downstream scanning tube lens. These two components may be single lenses or compound lens systems. The scanning eyepiece and the scanning tube lens together perform two functions. Firstly, the beam diameter is expanded, in particular to such an extent that the back focal plane of a microscope objective is fully illuminated. Secondly, the scanning mirror device, which includes, in particular, one or more scanning mirrors arranged one after the other, is imaged into the back focal plane of the microscope objective. Finally, the objective focuses the laser beam onto the specimen. In this configuration, a tilt of the laser beam imparted by the scanning mirror device results in a tilt of the laser beam at the position of the back focal plane, and thus causes the focal point to be displaced perpendicularly to the optical axis.

In order to switch from this first, confocal microscope illumination mode to a second, non-confocal illumination mode, for example, for purposes of performing a GSDIM method, it is essential in accordance with the present invention to insert a focusing lens into the path of the illumination beam. Because of this focusing lens, the laser beam is no longer focused into the specimen, but instead into the back focal plane of the microscope objective. The focusing lens may, in turn, be a single lens or a compound lens system.

As mentioned earlier, the illumination source device includes telescope optics for expanding the illumination beam for the first, confocal illumination mode. Such expansion is often necessary because the laser beam, prior to passing through the telescope optics, traverses an acousto-optical beam splitter (abbreviated AOBS) which, in turn, permits only a certain maximum beam diameter which is generally smaller than the beam diameter required at the scanning eyepiece. Consequently, the telescope optics are used to expand the laser beam between the AOBS and the scanning eyepiece.

In order to provide the second, non-confocal microscope illumination mode, the telescope optics are removed from the path of the illumination beam. In this way, the diameter of the illuminated specimen field is reduced, and the light intensity on the specimen is increased by a factor of about 25. Thus, this arrangement makes it possible to perform localization microscopy with high illumination intensities.

It is advantageous to insert the focusing lens into the illumination beam path between the scanning eyepiece and the scanning tube lens. This is an advantage especially in connection with the confocal microscopes currently marketed by the Applicant. In other configurations, the focusing lens can, in principle, also be inserted between the scanning tube lens and the back focal plane of the microscope objective as long as insertion of this focusing lens causes the illumination beam to be focused into the back focal plane of the microscope objective.

It is also advantageous if the focusing lens or, in the case of a multi-element design, a part of the focusing lens is movable along the optical axis to allow adjustment of the focus to objectives which have their back focal plane at different positions.

For the purpose of switching between the two aforementioned microscope illumination modes, it is expedient that the telescope optics be removed simultaneously with, or shortly after, the insertion of the focusing lens and vice versa.

As repeatedly noted hereinbefore, the microscope illumination system of the present invention is suitable, in particular, for switching between laser scanning microscope illumination, especially for confocal microscopy, and localization microscopy illumination, especially for a GSDIM method.

The present invention also relates to a microscope having a microscope objective and a microscope illumination system according to the present invention, as described in detail above. The configuration of a microscope, in particular of a confocal or localization microscope, is generally known from the prior art and will therefore not be discussed in detail herein. The light emitted from the specimen (emitted fluorescent radiation in the case of confocal microscopy) is focused through the microscope objective and additional downstream optics into a confocal pinhole, and from there passes on to a detector.

In localization microscopy, the observation beam originating from the specimen is coupled out between the scanning tube lens and the objective. To this end, a splitting mirror is disposed therebetween.

The present invention also relates to a method for providing illumination for localization microscopy, the intention being to enable this illumination mode, in particular, by switching to it from the confocal microscopy illumination. With regard to the method of the present invention, reference is made to the above explanations in connection with the microscope illumination system according to the present invention, and the embodiments and advantages described there. The disclosure presented there applies explicitly also to the method of the present invention.

Further advantages and embodiments of the present invention will become apparent from the description and the accompanying drawings.

It will be understood that the aforementioned features and those described below can be used not only in the specified combinations, but also in other combinations or alone without departing from the scope of the present invention.

The present invention is schematically illustrated in the drawings using an exemplary embodiment, and will be described below in detail with reference to the drawings.

DETAILED DESCRIPTION OF EMBODIMENTS

Figure 1A:
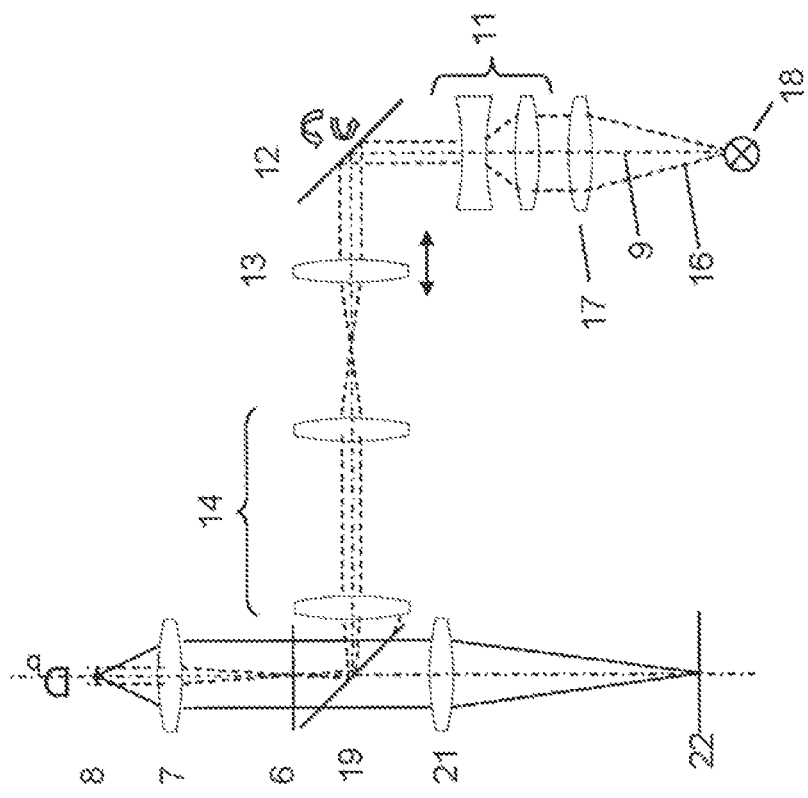
FIG. 1 is a schematic view of a microscope having an illumination apparatus for TIRF illumination (FIG. 1a) and for GSDIM illumination (FIG. 1b), whereby it is possible to switch between the two illumination modes.
Figure 1B:
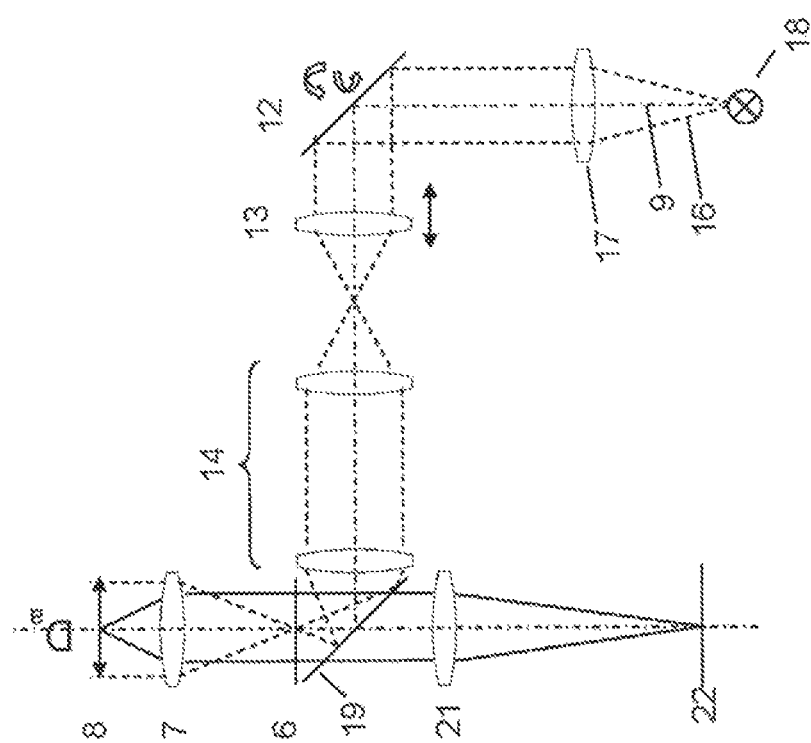

The design and principle of operation of the illumination units depicted in FIGS. 1a and 1b have been described in detail in the introductory part of the description.

Figure 2B:
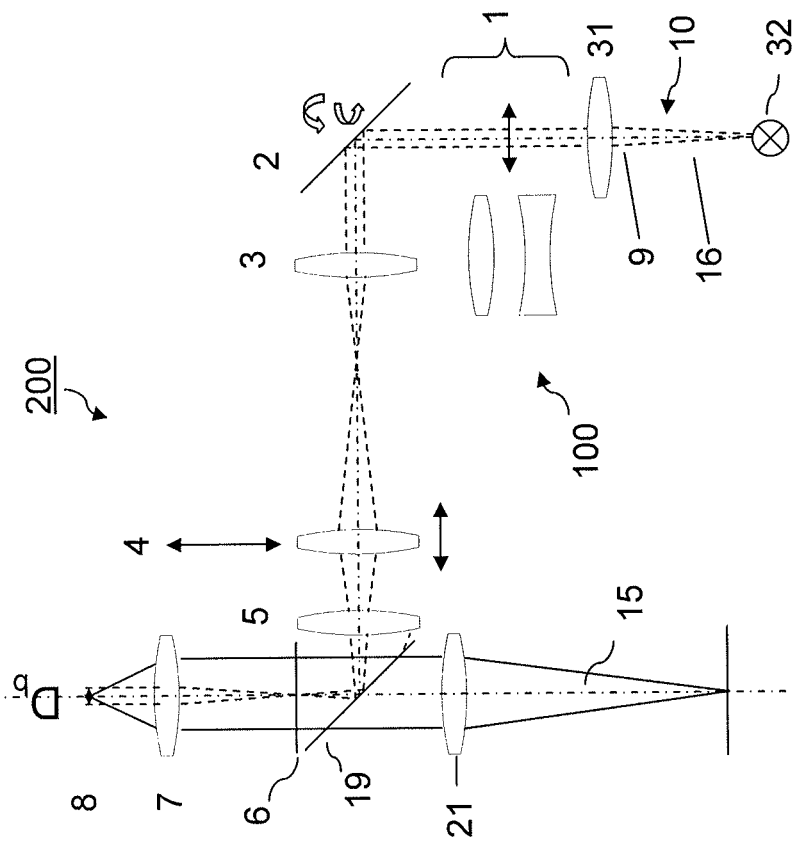
FIG. 2 is a schematic view of a microscope illumination unit for confocal microscopy (FIG. 2a) and a microscope having an illumination unit for a GSDIM method (FIG. 2b), whereby it is possible to switch between the two illumination modes.
FIG. 2c is a schematic view of a microscope illumination unit for confocal microscopy in accordance with an alternate embodiment.
Figure 2A:
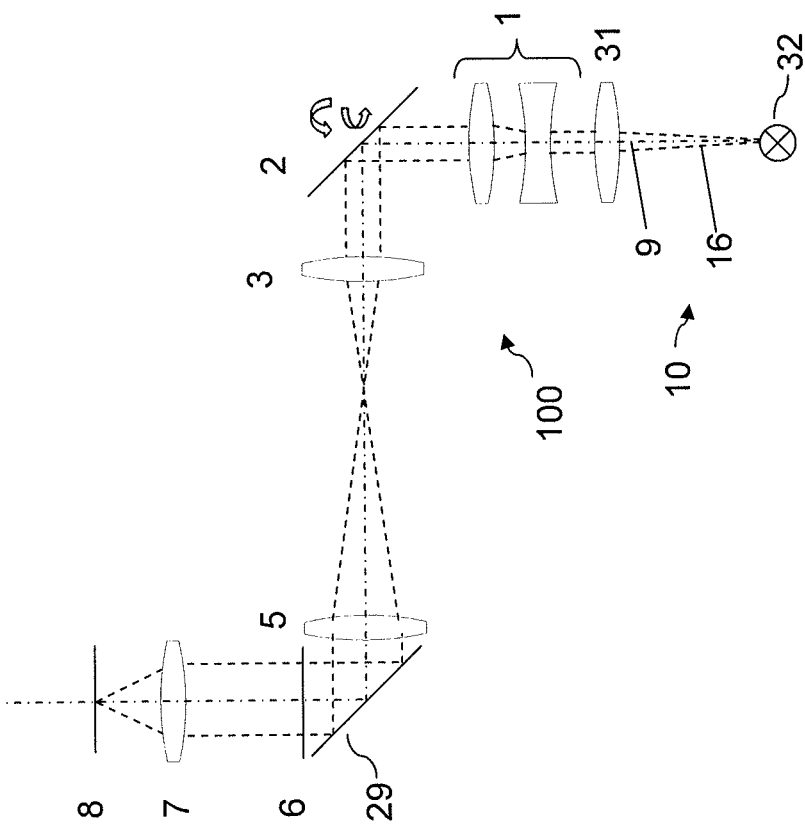

In FIG. 2, an embodiment of a microscope illumination system according to the present invention is shown very schematically. Specifically, FIG. 2a shows a microscope illumination unit 100 for a confocal microscope, and FIG. 2b shows a modification of this microscope illumination unit 100 for a GSDIM method. In both Figures, illumination beam 16 originates from light source 32 (typically a laser or another point light source) and initially propagates from below upwards. The light is collimated by collimating optics 31. The following assumes a laser beam having a wavelength adapted to induce fluorescent emissions in stained specimen 8.

In FIG. 2a, in addition to light source 32 and collimating optics 31, the illumination source device generally designated 10 also includes telescope optics 1 for expanding the laser beam, shown here as an illumination beam 16. The expanded laser beam strikes a scanning mirror device 2, indicated here as a scanning mirror. The scanning mirror can be tilted in two spatial directions in such a way that the resulting laser beam is tilted in a plane perpendicular to optical axis 9. The scanning eyepiece is denoted by 3. Between collimating optics 31 and telescope optics 1, the laser beam typically passes through an acousto-optical beam splitter (AOBS) (not shown), which separates the illumination beam from the observation beam and permits only a certain maximum beam diameter which is smaller than that required at scanning eyepiece 3. This is why in FIG. 2a telescope optics 1 are provided before scanning eyepiece 3 to expand the beam.

In FIG. 2a, a scanning tube lens 5 and a mirror 29 are disposed downstream of scanning eyepiece 3. Scanning eyepiece 3 and scanning tube lens 5 act together as additional telescope optics having two functions. Firstly, the beam diameter is further expanded to such an extent that back focal plane 6 of objective 7 is fully, and thus, optimally illuminated. Secondly, the scanning mirror is imaged to the position of back focal plane 6. Consequently, scanning mirror device 2 is located at a position conjugate to focal plane 6. Finally, objective 7 focuses the laser beam onto specimen 8. Specimen is suitably stained with fluorophores, so that the incident laser radiation results in excitation of fluorescence. By tilting the scanning mirror; i.e., by suitably controlling the scanning mirror device 2, the focus of the laser beam is moved in the focal plane of specimen 8, thus allowing scanning in a plane perpendicular to optical axis 9.

FIG. 2b schematically shows microscope illumination unit 100 of FIG. 2a, which is now adapted to provide a second microscope illumination mode, here for a GSDIM method, in a microscope 200. Like elements are given the same reference numerals and, therefore, are not described again. In the embodiment shown in FIG. 2b, in order to switch to the second microscope illumination mode, initially a focusing lens 4 is inserted into the path of beam 16. Focusing lens 4 and scanning tube lens 5 together ensure that the laser beam is focused into back focal plane 6 of microscope objective 7. In the embodiment shown, focusing lens 4 is inserted into the path of illumination beam 16 between scanning eyepiece 3 and scanning tube lens 5. The double-headed arrow below focusing lens 4 indicates that it is movable along optical axis 9. Thus, the position of focusing lens 4 can be adjusted to different positions of focal planes 6 when different objectives 7 are used.

Figure 2C:
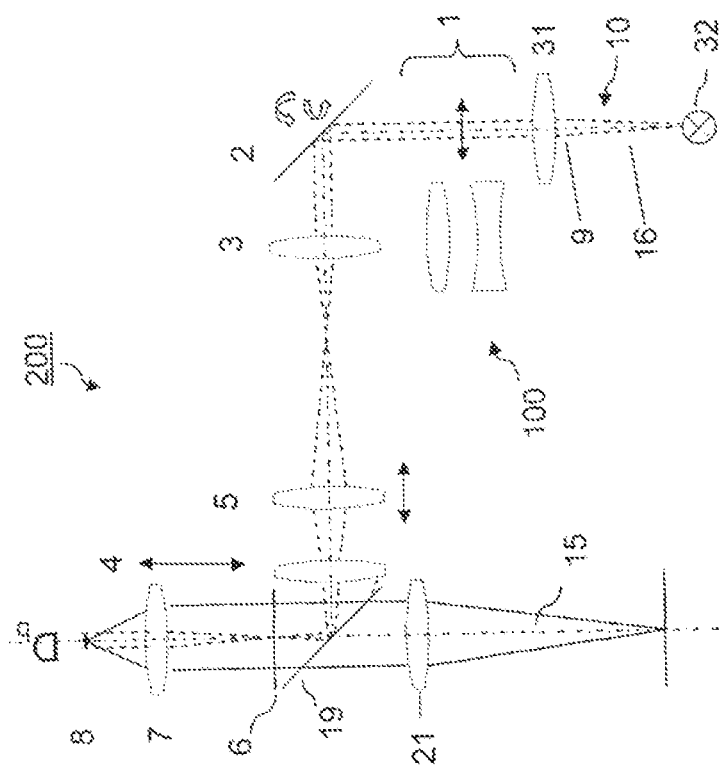

FIG. 2c schematically shows a microscope illumination unit 100 in which the focusing lens 4 is insertable into the path of the illumination beam 16 between the scanning tube lens 5 and the back focal plane 6 of the microscope objective 7.

Subsequent to, or simultaneously with, the insertion of focusing lens 4, telescope optics 1 are removed from the path of beam 16. In this way, it can be ensured that the illumination beam is not expanded, and thus strikes specimen 8 with a high intensity per unit area. In the here shown microscope illumination mode for a GSDIM method, there is no need to tilt the scanning mirror in scanning mirror device 2. By removing telescope optics 1 from the path of illumination beam 16, the intensity on specimen 8 can be increased 25 fold. Such power densities are required to impart sufficient excitation energy onto the irradiated specimen surface.

LIST OF REFERENCE NUMERALS 1 telescope optics
2 scanning mirror device
3 scanning eyepiece
4 focusing lens
5 scanning tube lens
6 back focal plane of the objective
7 objective
8 specimen
9 optical axis
10 illumination source device
11 telescope
12 scanning mirror
13 scanning eyepiece
14 transporting optics
15 observation beam
16 illumination beam
17 collimating optics
18 light source
19 splitting mirror
21 tube lens
22 image
29 mirror 31 collimating optics
32 light source, laser radiation source
100 microscope illumination unit
200 microscope

What is claimed is:

1. A microscope illumination system for switching between a first and a second microscope illumination mode, the microscope illumination system having a microscope illumination unit which, in order to provide the first microscope illumination mode, includes:
   an illumination source device for generating an illumination beam that propagates parallel to an optical axis,
   a scanning mirror device for deflecting the illumination beam in a plane perpendicular to the optical axis,
   a scanning eyepiece and a downstream scanning tube lens for imaging the scanning mirror device into a back focal plane of a microscope objective and for expanding the illumination beam, the microscope objective focusing the illumination beam onto a specimen to be examined, wherein,
   in order to provide the second microscopy illumination mode, the microscope illumination unit has a focusing lens which can be inserted into a path of the illumination beam in such a way that the illumination beam is focused into the back focal plane of the microscope objective, and
   the focusing lens is movable along the optical axis.

2. The microscope illumination system as recited in claim 1, wherein the focusing lens is insertable into the path of the illumination beam between the scanning eyepiece and the scanning tube lens.

3. The microscope illumination system as recited in claim 1, wherein the focusing lens is insertable into the path of the illumination beam between the scanning tube lens and the back focal plane of the microscope objective.

4. The microscope illumination system as recited in claim 1, wherein the illumination source device includes telescope optics for expanding the illumination beam.

5. The microscope illumination system as recited in claim 4, wherein in order to provide the second microscopy illumination mode, the telescope optics can be removed from the path of the illumination beam.

6. The microscope illumination system as recited in claim 1, wherein the first microscope illumination mode provides laser scanning microscopy illumination, including for confocal microscopy, and the illumination source device includes a laser radiation source.

7. The microscope illumination system as recited in claim 1, wherein the second microscope illumination mode provides illumination for localization microscopy, including for a GSDIM method, and the illumination source device includes a laser radiation source.

8. The use of a microscope illumination system according to claim 6 for switching between laser scanning microscopy illumination, including for confocal microscopy, and localization microscopy illumination, including for a GSDIM method.

9. A microscope having a microscope objective and a microscope illumination system according to claim 1.

10. The microscope as recited in claim 9, wherein a splitting mirror is disposed in the path of the illumination beam between the scanning tube lens and the microscope objective in such a way that it causes an observation beam originating from the specimen to be coupled out.

11. A method for switching between a first and a second microscopy illumination mode using a microscope illumination unit which provides the first microscopy illumination mode, the method comprising:
   generating an illumination beam that propagates parallel to a optical axis using an illumination source device,
   deflecting the illumination beam in a plane perpendicular to the optical axis using a scanning mirror device,
   imaging the scanning mirror device into a back focal plane of a microscope objective and expanding the illumination beam using a scanning eyepiece and a downstream scanning tube lens, and
   focusing the illumination beam onto a specimen to be examined using the microscope objective, wherein
   the microscope illumination unit provides the second microscope illumination mode in which a focusing lens is inserted into a path of the illumination beam in such a way that the illumination beam is focused into the back focal plane of the microscope objective, and the focusing lens is movable along the optical axis.

* * * * *